(12) United States Patent
Hasch et al.

(10) Patent No.: US 7,329,819 B2
(45) Date of Patent: Feb. 12, 2008

(54) STEERING COLUMN MODULE FOR A VEHICLE

(75) Inventors: Martin Hasch, Schwieberdingen (DE); Rainer Lipfert, Heilbronn (DE); Bernd Binder, Sersheim (DE); Roland Gruener, Tamm (DE); Karl Simonis, Illingen (DE); Juergen Suchanek, Gueglingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 10/563,096

(22) PCT Filed: Jun. 17, 2004

(86) PCT No.: PCT/EP2004/006511

§ 371 (c)(1),
(2), (4) Date: May 30, 2006

(87) PCT Pub. No.: WO2005/002917

PCT Pub. Date: Jan. 13, 2005

(65) Prior Publication Data

US 2006/0243570 A1    Nov. 2, 2006

(30) Foreign Application Priority Data

Jul. 1, 2003    (DE) .................... 103 30 489

(51) Int. Cl.
*H01H 9/00* (2006.01)

(52) U.S. Cl. .................... 200/61.54; 200/34; 200/38

(58) Field of Classification Search ............. 200/61.27, 200/61.28, 61.3, 61.31–61.38, 61.54–57
See application file for complete search history.

(56) References Cited

U.S. PATENT DOCUMENTS

| 6,222,142 B1 * | 4/2001 | Sano ..................... 200/61.54 |
| 6,225,582 B1 * | 5/2001 | Stadler et al. .......... 200/61.27 |
| 6,236,004 B1 | 5/2001 | Stadler |
| 6,333,475 B1 | 12/2001 | Kontani |
| 6,872,897 B2 * | 3/2005 | Otani et al. ............ 200/16 D |
| 6,891,115 B2 * | 5/2005 | Rudolph et al. ......... 200/61.54 |
| 7,180,020 B2 * | 2/2007 | Onoda et al. ........... 200/61.54 |
| 2003/0075422 A1 | 4/2003 | Otani |
| 2005/0087431 A1 * | 4/2005 | Otani et al. ............ 200/61.54 |

FOREIGN PATENT DOCUMENTS

| DE | 197 00 175 | 4/1998 |
| DE | 199 58 507 | 6/2001 |
| DE | 100 56 665 | 6/2002 |
| DE | 102 38 269 | 3/2003 |
| EP | 07 68 688 | 4/1997 |

* cited by examiner

*Primary Examiner*—Marina Fishman
(74) *Attorney, Agent, or Firm*—Paul Vincent

(57) ABSTRACT

The invention relates to a steering column module for a vehicle, especially for a motor vehicle. The steering column comprises a base housing, at least one switch unit which is arranged in or on the base housing and comprises a mechanism which is coupled to an actuating element, at least one printed circuit board arranged in or on the base housing, and at least one switch which can be displaced on the printed circuit board, the switch being coupled in a displaceable manner to the mechanism of the switch unit. The printed circuit board and the switch are associated with a common pre-mounted unit which is constructed in such a manner that the switch is movingly coupled to the mechanism of the switch unit during mounting of the switch unit to said pre-mounted unit.

9 Claims, 4 Drawing Sheets

STEERING COLUMN MODULE FOR A VEHICLE

This application is the national stage of PCT/EP2004/006511 filed on Jun. 17, 2004 and also claims Paris Convention priority of DE 103 30 489.4 filed on Jul. 01, 2003.

BACKGROUND OF THE INVENTION

The invention concerns a steering column module for a vehicle, in particular for a motor-vehicle, having a base housing and with at least one switching unit disposed on or in the base housing and having a mechanism coupled to a moving member, with at least one circuit board disposed on or in the base housing and with at least one contact switch which can be moved on the circuit board and which is coupled to the switching unit mechanism. Steering column modules of this type are disposed in the vicinity of steering wheels of vehicles and usually have a plurality of switching units. The switching units, operated e.g. via mechanisms in the form of switching levers, can be configured for blinkers, a switch for the high beam, a switch for the low beam, a switch for the windshield wipers or the like.

Conventional assembly of steering column modules of this type has turned out to be disadvantageous. In particular, the mounting of contact switches onto the circuit board, in which generally highly sensitive electrical or electronic components are disposed, has presented problems. The mounting of the switching units having contact switches onto the circuit board must be carried out very precisely and with great care to avoid damaging the circuit board when the contact switches are applied. In particular, hair cracks can occur in the circuit board that lead to malfunctions.

It is therefore the underlying purpose of the present invention to introduce a steering column module of the above-mentioned kind, which can be assembled in a simplified fashion.

SUMMARY OF THE INVENTION

This purpose is achieved with a steering column module of the above mentioned kind in that the circuit board and the contact switches belong to a common, pre-mounted unit which is configured in such a fashion that a motional coupling between the contact switch and the switching unit mechanism is effected when assembling the switching unit to the pre-mounted unit. In this fashion, no loading of the circuit board contact switch occurs during assembly of the steering column module. Moreover, the contact switch is part of a pre-mounted unit that includes the circuit board. The contact switch can therefore be completely pre-mounted to the circuit board independent of the switching unit. A coupling motion between the contact switch and the switching unit is first effected during mounting of the switching unit on the pre-assembled unit. Damage to the circuit board during the assembly of the switching unit is therefore advantageously avoided.

In accordance with the invention, at least portions of the base housing belong to the pre-mounted unit. The base housing, or portions thereof, therefore constitute, together with the circuit board and the contact switches, a unit that can be handled separately from the switching units.

In a further embodiment in accordance with the invention, the pre-mounted unit has a housing section, which covers at least portions of the circuit board. In this fashion, at least portions of the circuit board, preferentially the complete circuit board, are covered in a protective fashion. This curtails damage to the circuit board or the electrical or electronic components on the circuit board.

Appropriate securing means are advantageously provided on the pre-mounted unit for securing the position of the contact switch on the pre-mounted unit. In this fashion, an unintentional motion of the contact switch on the circuit board can be prevented.

The switching unit can have means for unlocking the securing means during assembly of the switching unit to the pre-mounted unit. The unlocking means can thereby e.g. deflect the securing means out of position securing the contact switch, to release the contact switch.

Securing tongues that, due to their material elasticity, can cooperate with the corresponding contact switch can form the securing means. The securing tongue can e.g. be configured as a single piece together with a housing section surrounding the circuit board and can e.g. be formed on this housing section.

In particular, pin-shaped elevations can be used for unlocking means, which are configured in such a fashion as to deflect the corresponding securing tongue during mounting of the pre-mounted unit, to release the contact switch. The securing tongues can e.g. engage in a securing receptacle on the contact switch.

In accordance with the invention, the pre-assembled unit and the switching unit may have centering means for precise positioning during assembly. Centering means can guide the two units together in such a fashion that a motional coupling of the mechanism to the contact switch is guaranteed.

Moreover, the contact switch can have a centering opening that is configured to cooperate with a free end of a lever arm of the mechanism during assembly. The free end of the lever arm is motion-coupled to the contact switch during assembly via the centering opening.

In a specially preferred embodiment of the invention, the switching unit has a switching housing which can be disposed on the base housing accepting the circuit board. In this fashion, the switching unit, without the contact switch, as well as the base housing accommodating the circuit board and the contact switch are both independent, pre-mounted units and can be handled as such. Advantageously, the switching unit does not have any electronic or electrical components, rather only has a mechanism for transmitting the motion of the operating mechanism, which is coupled for motion to the corresponding contact switch in the final mounted assemble state. Due to the motional coupling between the contact switch and the switching unit, additional electrical connections between the switching unit and the circuit board are not needed.

A plurality of switching units, each having its own individual housing, can be disposed on the circuit board or on a base housing. The corresponding switching housings and the base housing accepting the circuit board thereby each constitute self-contained, pre-mounted units which can be separately handled.

Further advantageous configurations and details of the invention can be extracted from the following description in which the invention is described and explained more closely with reference to the embodiment shown in the drawing.

DESCRIPTION OF THE PREFERRED EMBODIMENT

Figure 1:
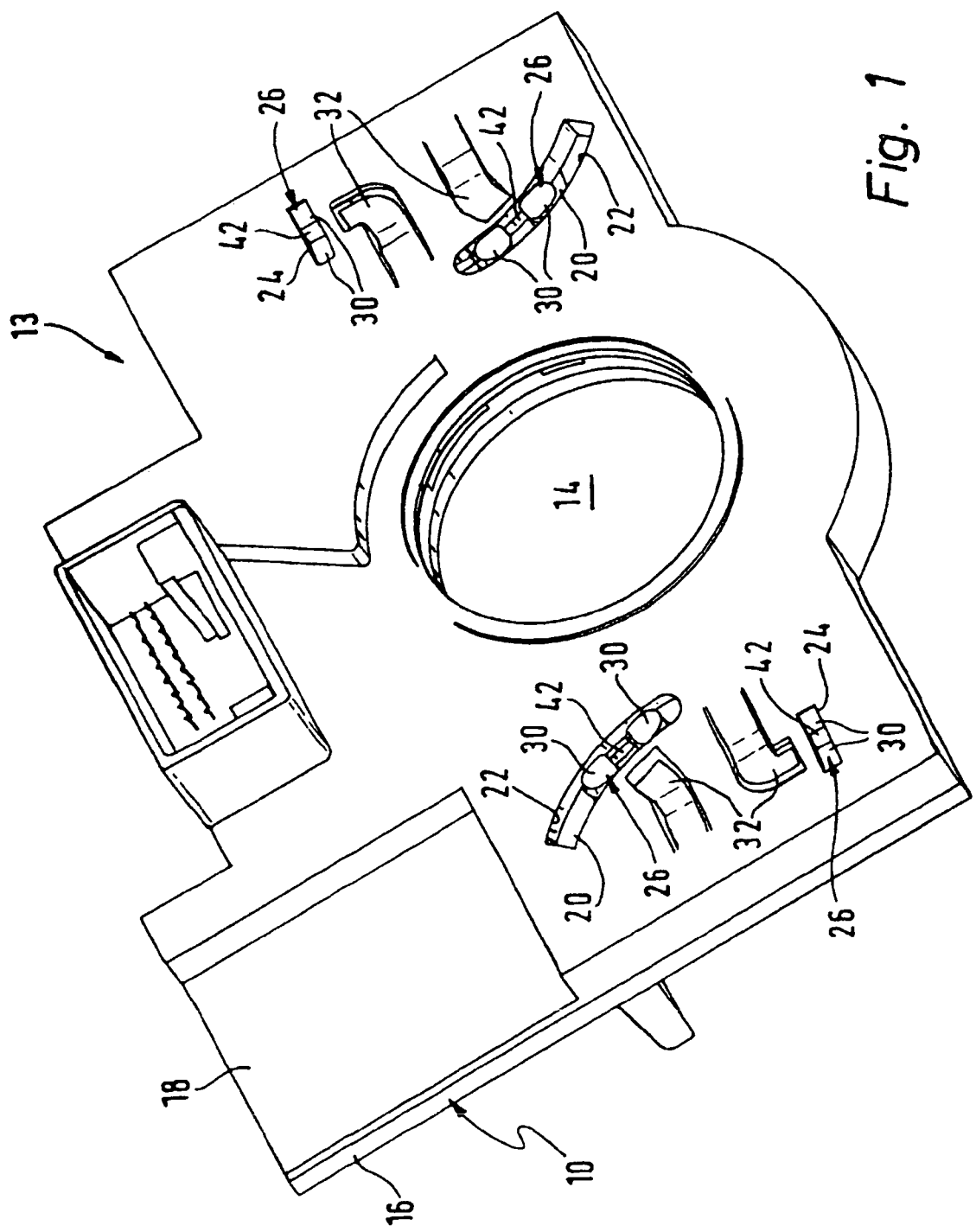
FIG. 1 shows a view of the lower side of a base housing of a steering column module in accordance with the invention.
Figure 3:
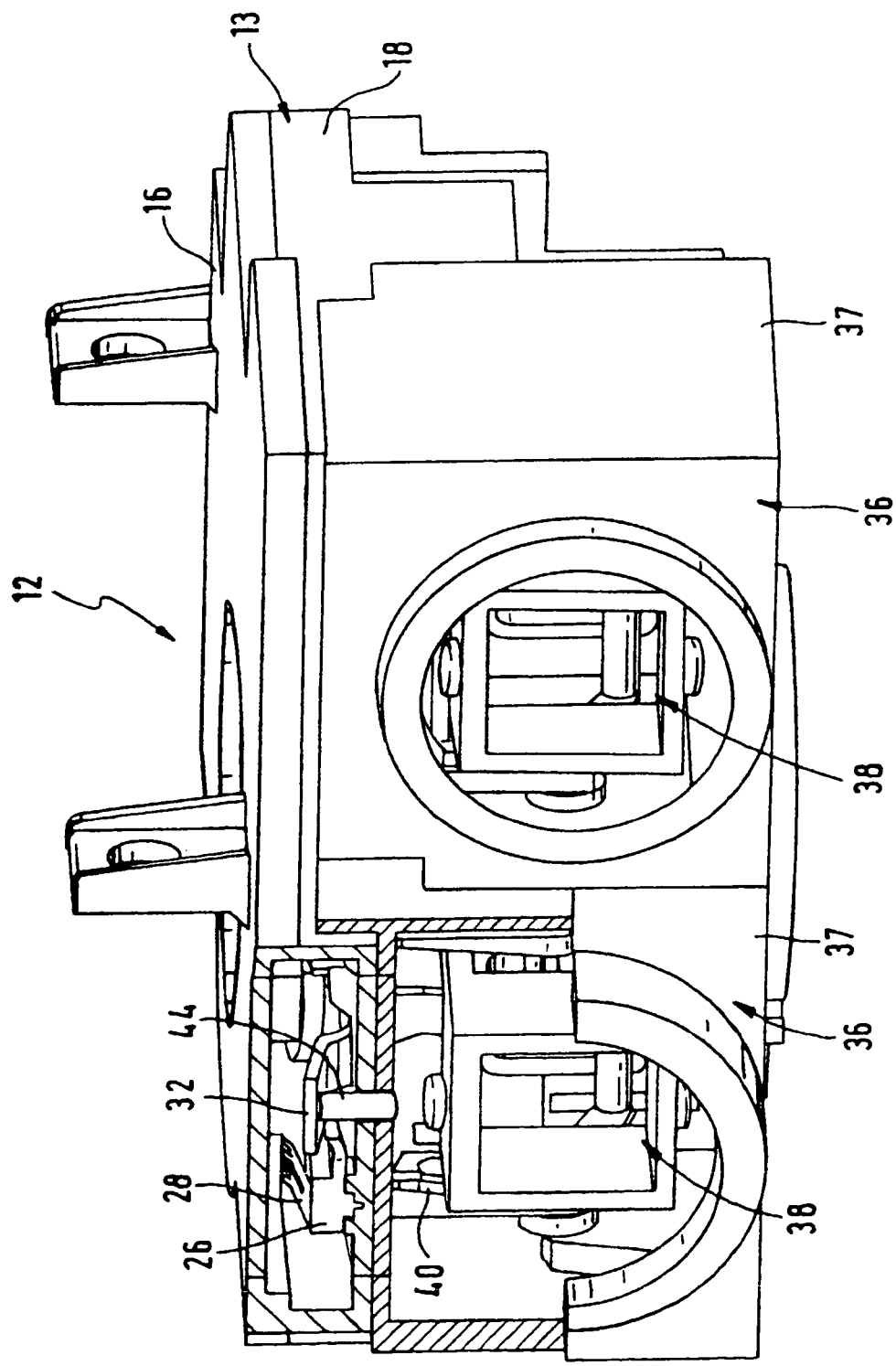
FIG. 3 shows a partial cut through a switching unit disposed on the base housing according to FIG. 1 and 2.
Figure 4:
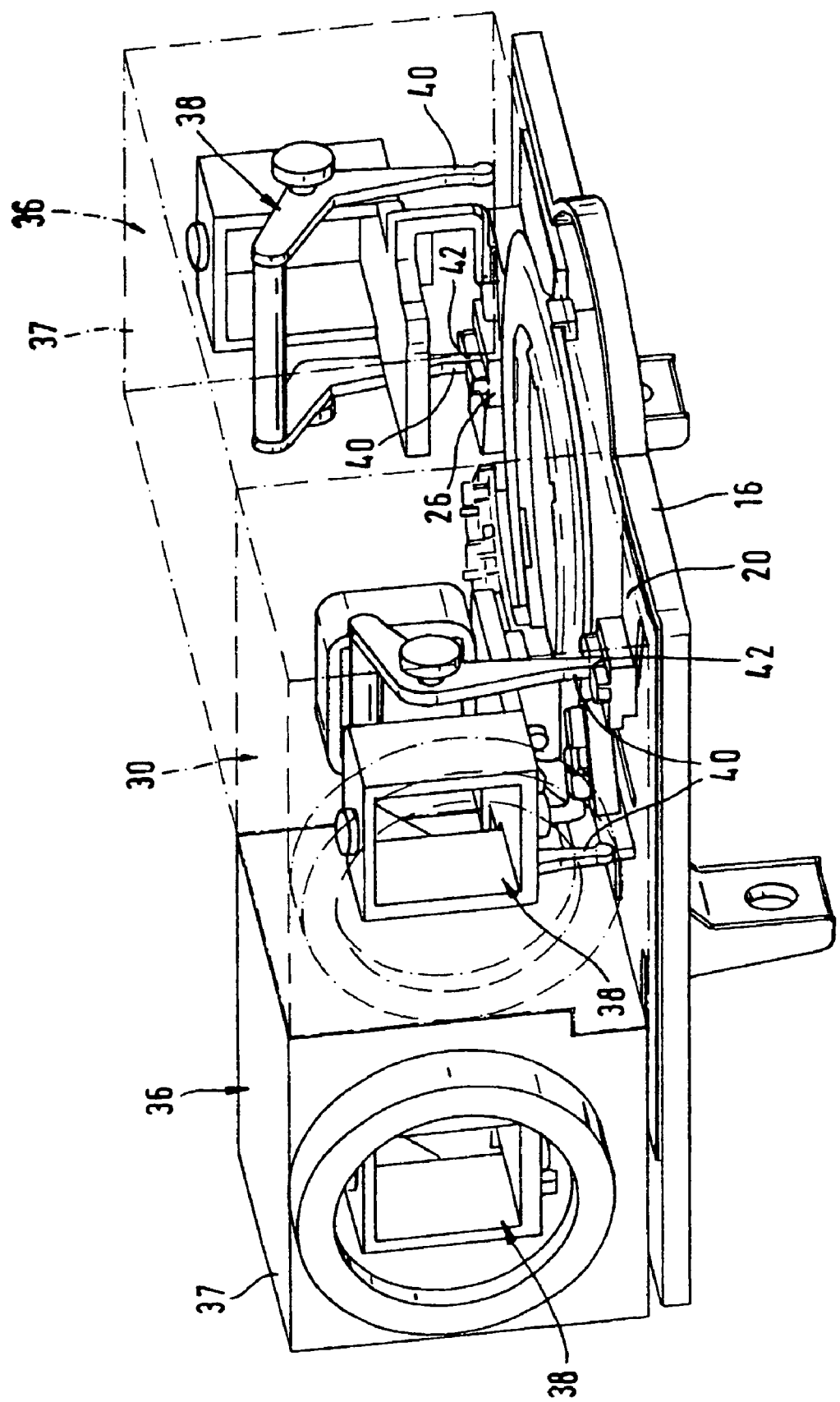
FIG. 4 shows a completely mounted steering column module in a partially transparent view.

FIG. 1 shows a base housing 10 of a steering column module 12 in accordance with the invention (shown in FIGS. 3 and 4 in the final mounted state). The base housing 10 has a central opening 14 for the outer shell of a steering column (not shown). The two component base housing 10 includes a first housing component 16 and as well as a second housing component 18.

Figure 2:
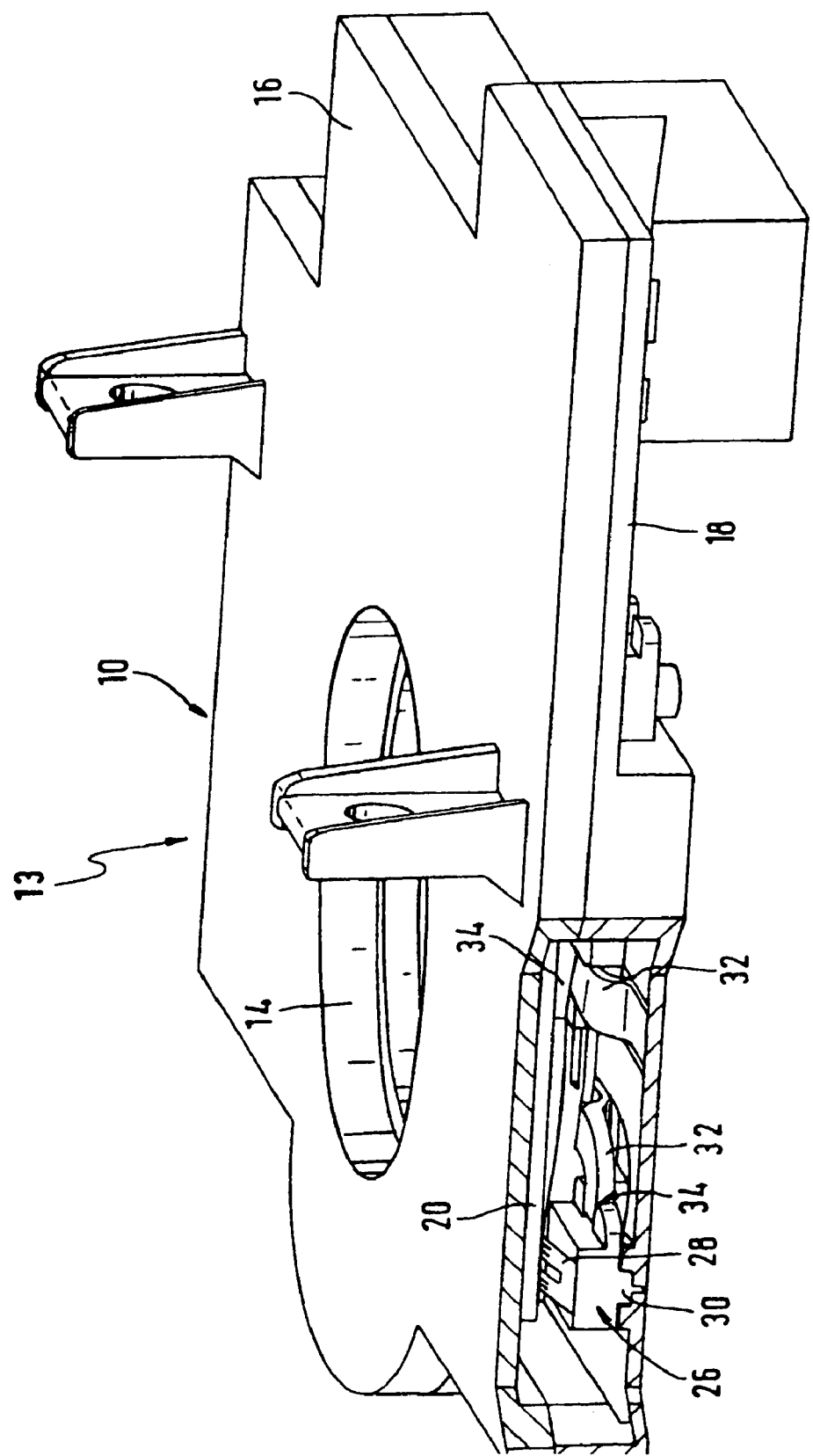
FIG. 2 shows a partial cut through a base housing according to FIG. 1.

As can be particularly well seen in FIGS. 2 and 3, the base housing 10 accommodates a circuit board 20 having electronic and/or electrical components. The circuit board 20 can be partially seen in FIG. 1 through guide openings 22, 24 on the housing portion 18.

The guide openings 22 are curved and the guide openings 24 are straight. The guide openings 22 and 24 each serve for guiding contact switches 26, which can be clearly seen in FIGS. 2, 3 and 4. The contact switches 26 each have contact springs 28 facing the circuit board 20 and pin-like guiding sections 30 are disposed in corresponding guide openings 22, 24. Different contact springs are contacted on the circuit board in dependence on the position of the contact switch 26 and the guide openings 22 and 24. The base housing shown in FIG. 1 constitutes, together with the circuit board 20 and the contact switches 26, a separate, pre-mounted unit 13 of the steering column module 12 in accordance with the invention. Securing means 32 are provided in the pre-mounted unit 13 (see FIGS. 1 and 2) in order to prevent motion of the contact switch 26 in the guiding openings 22, 24.

The securing means 32 are configured as securing tongues, which are formed on the housing component 18. FIG. 2 clearly shows that the securing tongues 32, which are set back from the inner side of the basic housing 10, engage in receptacle sections 34 of the contact switch 26. The contact switches 26 are thereby fixed in their pre-mounted position and secured with respect to motion in the guide openings 22, 24.

The housing component 18 of the pre-mounted unit 13 shown in FIGS. 1 and 2 advantageously covers the circuit board in a protective fashion. Moreover, the contact switches 26, which contact the circuit board, are secured in the pre-mounted position by securing means 32.

In order to assemble the steering column module 12, the switching units 36 (see in FIGS. 3 and 4) are placed onto the housing member 18. The switching units 36 include switching mechanisms 38, each of which is disposed in a switching housing 37 and is coupled for cooperation with a contact switches 36 when disposing the corresponding switching unit 36 on the pre-assembled unit 13. For coupling motion, the switching mechanisms 38 have lever arms 40 that engage into centering receptacles 42 of the contact switches 26 disposed between the guiding sections 30.

The switching units 36 include (see FIG. 3) pin-shaped unlocking mechanisms 44 which deflect the corresponding securing tongues 32 during mounting of the pre-mounted unit to release the corresponding contact switches 26. The contact switches 26 then follow, within the corresponding guide openings 22, 24, the motion of the lever arms 40 which are deflected from the activating members by the corresponding mechanism 38.

In order to simplify assembly, centering means are provided on the pre-mounted unit 13 and on the switching units 36 (not shown in greater detail).

The switching units 36 are individual, pre-mounted units which are disposed onto the pre-assembled unit 13 during final assembly. In this manner, damage to the circuit board 22 during final assembly is prevented.

The housing member 18 is not shown in FIG. 4, so that the circuit board 20 is visible. A total of three switching units 36 are shown in FIG. 4 disposed on the pre-assembled unit 13 or on the base housing 10.

The switching unit 36 advantageously includes no electrical or electronic components. The electronic components associated with the switching units 36 are located on the circuit board 20 of the pre-mounted unit 13. In this fashion, electrical connection means between the switching units 30 and the pre-assembled unit 13 are not necessary.

All of the features described in the specification and claims as well as in the drawing can be important to the invention individually and in arbitrary combination.

We claim:

1. A steering column module for a vehicle or for a motor-vehicle, the module comprising:
    a base housing;
    a switching unit disposed on or in said base housing said switching unit having a mechanism coupled to a moving member;
    at least one circuit board disposed in or on said base housing;
    at least one contact switch mounted for motion on said circuit board and coupled for cooperation with said mechanism of said switching unit, wherein said circuit board and said contact switch belong to a common, pre-assembled unit, said unit being configured in such a fashion that coupling for motion between said contact switch and said mechanism of said switching unit transpires during assembly of said switching unit to said pre-assembled unit; and
    securing means disposed on said pre-assembled unit to secure a position of said contact switch, wherein said switching unit has unlocking means which unlock said securing means during assembly to said pre-assembled unit.

2. The steering column module of claim 1, wherein at least portions of said base housing belong to said pre-assembled unit.

3. The steering column module of claim 1, wherein said pre-assembled unit has housing sections which cover at least portions of said circuit board.

4. The steering column module of claim 1, wherein said securing means comprise a securing tongue which cooperates with said contact switch.

5. The steering column module of claim 4, wherein said unlocking means as comprise a raised pin-shaped structure which deflects said securing tongue when mounting to said pre-assembled unit for releasing said contact switch.

6. The steering column module of claim 1, wherein said pre-assembled unit and said switching unit have centering means for common mutual alignment during assembly.

7. The steering column module of claim 1, wherein said contact switch has a central receptacle which cooperates with a free end of a lever arm of said mechanism during assembly.

8. The steering column module of claim 1, wherein said switching unit has a switching housing which can be disposed on said base housing.

9. The steering column module of claim 1, wherein, in a final mounted state, a plurality of said switching units are disposed in corresponding switching housings on said pre-assembled unit.

* * * * *